(12) United States Patent
Wahl et al.

(10) Patent No.: US 10,882,139 B2
(45) Date of Patent: Jan. 5, 2021

(54) METHOD FOR THE ADDITIVE MANUFACTURE OF METALLIC COMPONENTS

(71) Applicants: Matthias Wahl, Darmstadt (DE); Alexander Weil, Mainz (DE)

(72) Inventors: Matthias Wahl, Darmstadt (DE); Alexander Weil, Mainz (DE)

(73) Assignee: Evobeam Gmbh, Mainz (DE)

( * ) Notice: Subject to any disclaimer, the term of this patent is extended or adjusted under 35 U.S.C. 154(b) by 229 days.

(21) Appl. No.: 15/736,795

(22) PCT Filed: Jul. 5, 2016

(86) PCT No.: PCT/EP2016/065757
§ 371 (c)(1),
(2) Date: Dec. 15, 2017

(87) PCT Pub. No.: WO2017/009094
PCT Pub. Date: Jan. 19, 2017

(65) Prior Publication Data
US 2018/0178325 A1 Jun. 28, 2018

(30) Foreign Application Priority Data
Jul. 15, 2015 (DE) .................... 10 2015 008 919

(51) Int. Cl.
*B23K 26/34* (2014.01)
*B23K 26/12* (2014.01)
*B33Y 10/00* (2015.01)
*B33Y 40/00* (2020.01)
*B23K 15/00* (2006.01)
*B23K 26/08* (2014.01)
(Continued)

(52) U.S. Cl.
CPC ............ *B23K 26/34* (2013.01); *B22F 3/1055* (2013.01); *B23K 15/002* (2013.01); *B23K 15/0086* (2013.01); *B23K 15/06* (2013.01); *B23K 26/0861* (2013.01); *B23K 26/127* (2013.01); *B23K 26/1224* (2015.10); *B23K 26/342* (2015.10); *B23K 26/354* (2015.10); *B33Y 10/00* (2014.12); *B33Y 40/00* (2014.12)

(58) Field of Classification Search
CPC .............. B23K 26/342; B23K 26/0861; B23K 26/1224; B23K 26/127; B23K 15/002; B23K 15/06; B23K 15/0086; B23K 26/34; B33Y 40/00; B33Y 10/00
USPC ........................... 219/121.66, 121.65, 121.6
See application file for complete search history.

(56) References Cited

U.S. PATENT DOCUMENTS 3,852,560 A * 12/1974 Streel .................... B23K 15/00
219/121.12
6,751,516 B1 * 6/2004 Richardson ........... B22F 3/1055
700/118

(Continued)

*Primary Examiner* — Erin Deery

(57) ABSTRACT

The invention relates to a method for the additive manufacture of three-dimensional metallic components (12), said components (12) being built layer-by-layer or section-by-section under vacuum conditions by fusing a metallic material with the component (12) at a machining point by means of a radiation source with a high energy density. In order to keep the energy applied to the machining point by the radiation itself relatively low, the metallic material is supplied in the form of a wire (28) which is preheated under vacuum conditions before reaching the machining point.

11 Claims, 2 Drawing Sheets

(51) Int. Cl.
*B23K 15/06* (2006.01)
*B23K 26/342* (2014.01)
*B22F 3/105* (2006.01)
*B23K 26/354* (2014.01)

(56) References Cited

U.S. PATENT DOCUMENTS

| | | | | |
|---|---|---|---|---|
| 7,168,935 | B1* | 1/2007 | Taminger | B29C 64/141 |
| | | | | 425/174.4 |
| 2002/0117485 | A1* | 8/2002 | Jones | B23K 1/0018 |
| | | | | 219/121.64 |
| 2005/0173380 | A1* | 8/2005 | Carbone | B22F 3/1055 |
| | | | | 219/121.31 |
| 2005/0181228 | A1* | 8/2005 | McCullough | B21C 23/005 |
| | | | | 428/611 |
| 2008/0105659 | A1* | 5/2008 | Arnett | B23K 15/0006 |
| | | | | 219/121.14 |
| 2011/0297658 | A1* | 12/2011 | Peters | B23K 9/02 |
| | | | | 219/162 |

* cited by examiner

METHOD FOR THE ADDITIVE MANUFACTURE OF METALLIC COMPONENTS

RELATED APPLICATIONS

This application is a National Phase of PCT Patent Application No. PCT/EP2016/065757 having International filing date of Jul. 5, 2016, which claims the benefit of priority of German Patent Application No. 10 2015 008 919.6 filed on Jul. 15, 2015. The contents of the above applications are all incorporated by reference as if fully set forth herein in their entirety.

FIELD AND BACKGROUND OF THE INVENTION

The present invention relates to a method for the additive manufacture of three-dimensional metallic components, wherein the components are built up in layers or sections under vacuum conditions by fusion of a metallic material with the component at a processing location by means of a radiation source with high energy density.

Such methods are known for example from EP 1 296 788 B1 or DE 10 2013 108 111 A1. Proceeding from a substrate as a starting point for the body to be manufactured, such as can also be used in the case of the present invention, the conventional approach provides that, in the methods according to the prior art, a powder layer is firstly applied to the already generated sections of the workpiece, wherein the powder layer is subsequently fused, by means of a suitable radiation source, such as for example a laser or an electron beam gun, to the underlying surface at those locations at which an application of material is desired. This process is repeated until the desired component has been manufactured, wherein even complex three-dimensional structures are possible by means of the layered construction, which cannot be produced, or can be produced only with very high outlay, using conventional manufacturing methods.

It has however been found that, owing to the application of a further powder layer that is necessary after every layer, which further powder layer must furthermore also be spread smooth, firstly a very great expenditure of time is necessary, and secondly, relatively large quantities of metallic material in the form of powder accumulate which cannot at all be fused with the component. It is self-evident that, in the known method, the residual powder accumulates in particularly large quantities if the component to be manufactured has a relatively large number of cavities and recesses in relation to the base area.

A further problem may consist in that, for the application of the respective layer, a relatively large amount of energy must be supplied by means of the laser or electron beam, which may lead to undesirably deep fusion of the already generated material layers, which can impair the quality of the component to be manufactured.

From the field of welding technology, it is already known to supply a wire. It has however been found that the above-discussed problem of the high input of heat arises specifically in the case of a supply of wire.

SUMMARY OF THE INVENTION

It is the object of the present invention to provide a method of the type mentioned in the introduction which can be carried out with relatively little introduction of energy by the radiation at the processing location.

According to the invention, the object is achieved by means of a method of the type described in the introduction in which the metallic material is supplied as a wire, wherein the wire is preheated under vacuum conditions before reaching the processing location.

It has been found that the method can be carried out with altogether greater precision, and with a low introduction of heat into the workpiece material in particular below the processing location. By virtue of the fact that, by means of the preheating of the wire, a considerable fraction of energy in the form of heat has already been supplied to the wire before it reaches the fusion point, the radiation energy of the laser or electron beam can be configured to be lower, such that a melt bath generated at the processing location extends to a lesser depth into the already applied layers of the component. The radiation source can possibly also be dimensioned to be smaller.

The supply of wire furthermore makes it possible for the metallic material to also be supplied exactly only in the required quantity, such that, within the vacuum conditions that are generally generated within a closed vacuum chamber, less residual material that must be disposed of arises.

A further advantage of the method according to the invention consists in that it can be performed continuously at least in regions, for example by virtue of the surface of the workpiece being passed over with the processing location in line-by-line fashion.

The processing location preferably moves relative to the workpiece by virtue of the workpiece being moved relative to the processing location, which is arranged in static fashion.

The introduction of the heat energy into the wire within the vacuum conditions may for example be performed by virtue of the wire being inductively or electrically preheated. In the case of inductive preheating, an alternating magnetic field is built up by means of a coil surrounding the supplied wire, which alternating magnetic field generates eddy currents in the wire, which cause the wire to be heated. The alternatively possible direct electric preheating (resistance heating) is preferably technically implemented by virtue of the current for heating the wire being conducted via the wire and via the workpiece from which the component is built-up. This is made possible by the contact of the wire with the melt bath.

The wire is preferably heated using direct current, wherein a negative polarity is applied to the wire and a positive polarity is applied to the workpiece.

In a further preferred embodiment of the invention, the wire is supplied through a vacuum leadthrough into the vacuum chamber already discussed, in which the component is manufactured in step-by-step fashion by means of the build-up of the workpiece.

In order that the volume in the vacuum chamber is not made unduly large, it is advantageous for the wire to be stored outside the vacuum chamber.

The wire is preferably supplied preheated into the chamber. This measure may be desirable if it is sought to keep the heating power of the inductive or direct electric heating device arranged in the chamber as low as possible. The temperature of the wire however cannot be selected to be arbitrarily high before the supply into the vacuum chamber, such that this measure can be used only in a supplementary manner.

The fusion energy is preferably imparted by means of a laser beam, though it is also alternatively readily possible for the energy to be imparted by means of an electron beam.

The laser beam is preferably introduced into the vacuum chamber through a window, such that the main components of the laser can be arranged outside the vacuum chamber. The window is preferably equipped with a gas purging facility in order to prevent metal vapors from condensing on the generally relatively cool window inner surface and being able to block the window over time. The gas purging is generally performed with an inert gas, and is configured such that the vacuum conditions are not disrupted.

The wire is heated with the greatest possible intensity by means of the preheating, without the quality of the material application on the workpiece for the generation of the component being impaired as a result of excessively intense heating. This means that the temperature of the wire can be increased into the proximity of the solidus temperature of the metallic material or even above said temperature, without loss of control of the material application. Rather, it is possible in this way for the energy of the laser or electron beam to be reduced to such an extent that a particularly precise application on the workpiece is made possible.

The feed rate of the wire is self-evidently dependent on the desired quantity of material at the location respectively being processed, and may for example also be stopped entirely if it is sought for no material application whatsoever to be performed at certain locations of the workpiece.

BRIEF DESCRIPTION OF THE SEVERAL VIEW OF THE DRAWINGS

Two exemplary embodiments of the invention will be discussed in more detail below on the basis of the appended drawings. In the drawings.

DESCRIPTION OF SPECIFIC EMBODIMENTS OF THE INVENTION

Figure 1:
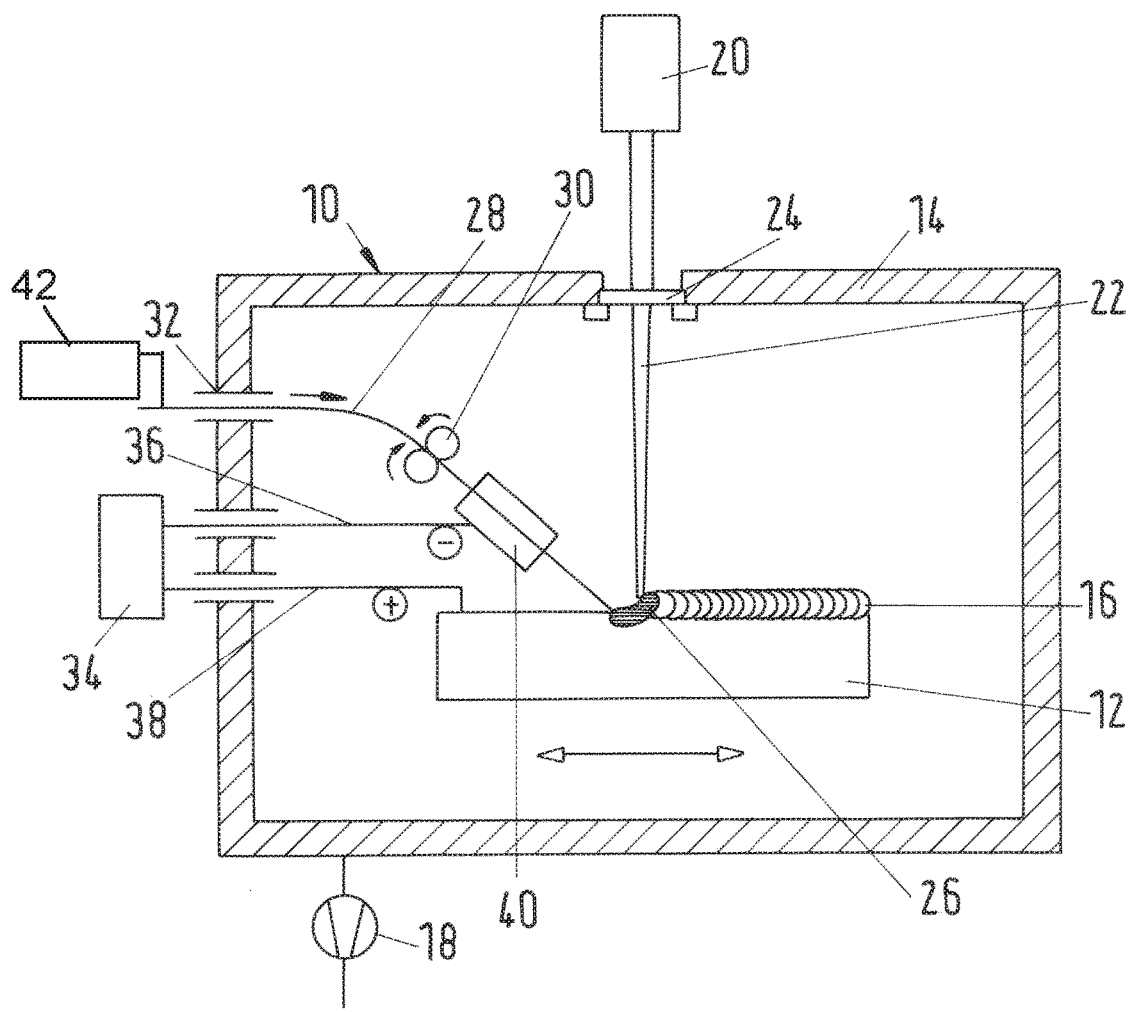
FIG. 1 shows a longitudinal section through a device for the additive manufacture of a metallic component.

FIG. 1 shows a device 10 with which a method for the additive manufacture of a metallic component 12 in a vacuum chamber 14 can be performed. The component 12, which in FIG. 1 is shown still as a workpiece in an intermediate stage, is mounted on a table (not shown in any more detail) which permits a movement of the component in the X, Y and Z directions. The component 12 is generated in layered fashion in the context of the additive manufacture, that is to say, in the exemplary embodiment shown in FIG. 1, a series of layers has already been applied, wherein the present applied material layer 16 has, for illustrative purposes, been illustrated on an exaggeratedly large scale. The first layer may be built up on a substrate that has been introduced into the chamber 14 beforehand.

A vacuum pump 18 evacuates the interior of the vacuum chamber 14 to the pressure values that are conventional in the field of thermal processing methods in a vacuum.

The introduction of energy required for the fusion of supplied metallic material in the applied material layer 16 is provided by means of a laser 20 which is arranged outside the vacuum chamber 14. The laser beam 22 is conducted through an entrance window 24 in the wall of the vacuum chamber 14 to a processing location on the component 12, at which a melt bath 26 forms owing to the high light power of the laser 20. Aeration (not illustrated in any more detail) of the inner side of the entrance window 24 prevents metal vapors from being able to precipitate there as condensate.

The metallic material is supplied as a wire 28, by means of a wire supply which is illustrated in highly simplified form, to the processing location at the melt bath 26. Here, the wire 28 is supplied through a vacuum leadthrough 32 in the wall of the vacuum chamber 14 into the interior of the vacuum chamber, and is advanced for example by means of driven friction rollers 30.

In the exemplary embodiment shown, the wire 28, which may possibly have already been preheated outside the vacuum chamber 14, e.g., by heat source 42, is heated further by means of a resistance heater, such that, already before it reaches the processing location, said wire reaches a temperature in the region of the solidus point of the metallic material. In the exemplary embodiment shown in FIG. 1, to form a resistance heater, a current source 34 is provided which is arranged outside the vacuum chamber and which, by means of electrical connection lines 36, 38 which led in pressure-tight fashion through the wall of the vacuum chamber 14, is connected on the one hand to the workpiece and on the other hand, via an electrical contactor 40, to the wire 28. For the heating, a direct current is used, wherein the negative polarity is connected to the electrical contactor 40, and the positive polarity is connected to the workpiece 12. The electrical connections are dimensioned such that the resistance of the supplied wire 28 between the electrical contactor 40 and the melt bath 26 on the workpiece surface ensures heating of the wire to the desired temperature.

As a result of the additional heating of the wire 28 before it reaches the melt bath 26, the light power of the laser 20 can be set to be considerably lower than would be necessary without electric preheating of the wire 28. This has the advantage that the melt bar 26 extends to a lesser depth into the workpiece, such that previously applied layers on the workpiece 12 are impaired to a lesser extent by the application of the further layer. Aside from the advantage of more precise execution of the method, the laser 20 can also be dimensioned to be smaller, which has a positive effect on the overall costs of the device 10.

As the wire is being supplied, under the action of the electric heating and the laser beam, the wire is fused in the melt bath 26 and is applied as a material layer 16 to the workpiece 12. During the process, the component 12 is moved in a processing direction, such that a line-by-line construction is realized. It is basically also possible for movements to be performed simultaneously in multiple corner directions, but in general, a line-by-line construction of the material will be desired. If a discontinuous form of the material layer is desired at a particular location, because it is sought for no material to be present there on the finished component owing to the construction, the supply of the wire is interrupted, the laser beam is deactivated, and/or the movement speed of the component 12 is briefly greatly increased in said regions.

Figure 2:
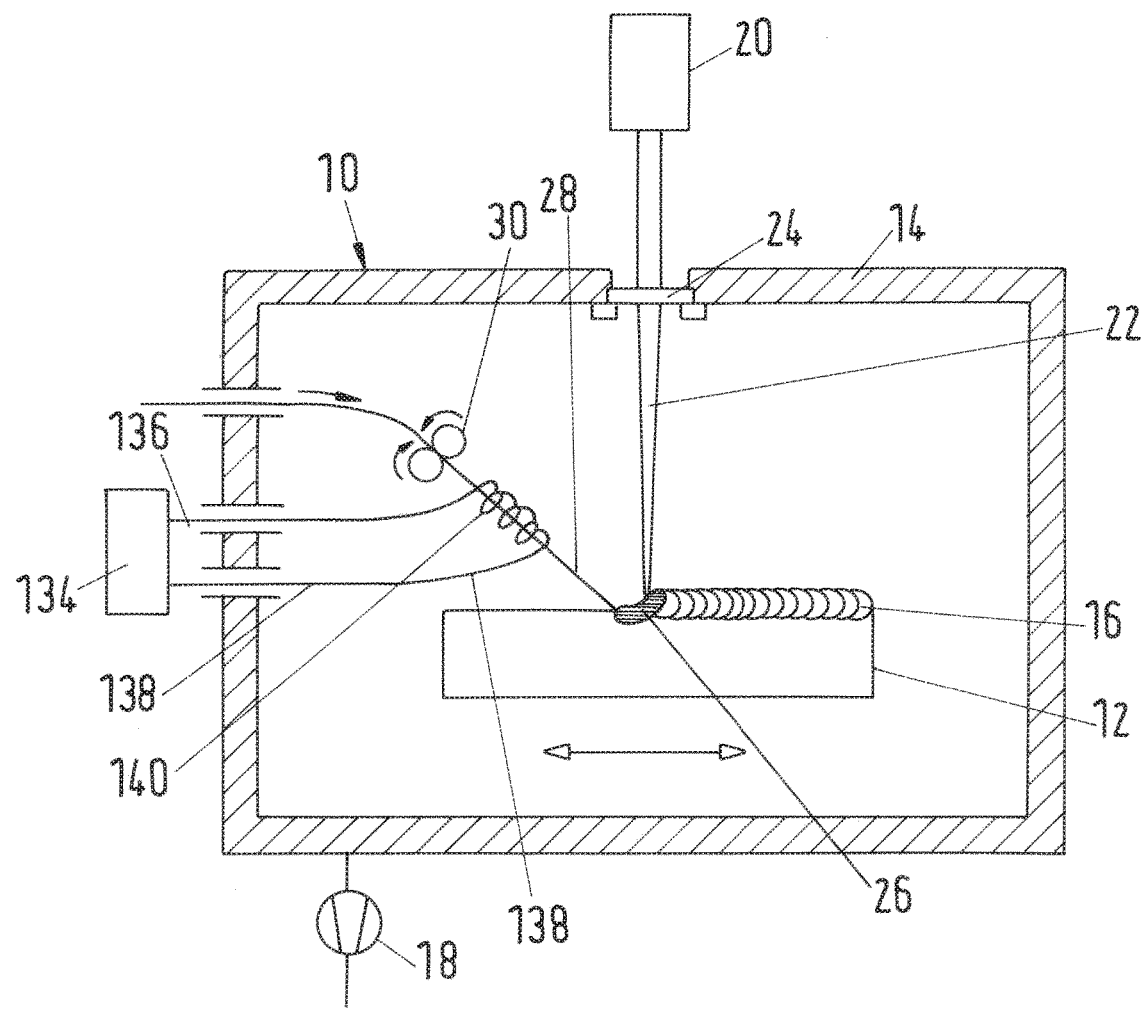
FIG. 2 shows a longitudinal section through a further device for the additive manufacture of a metallic component.

FIG. 2 shows a further device 10 which corresponds in terms of most of the structural details to the device 10 shown in FIG. 1, and which has therefore also been provided substantially with identical reference designations. By contrast to the resistance heater formed in FIG. 1 for the heating of the wire 28 before it reaches the melt bath 26, it is the case in the embodiment shown in FIG. 2 that an induction heater is provided, in the case of which a current source 134 arranged outside the vacuum chamber is connected via electrical supply lines 136, 138 through vacuum-tight leadthroughs to an induction coil 140, which surrounds the wire between the wire supply 30 and the melt bath 26. In this way, by means of the generation of eddy currents in the wire, inductive preheating of the wire to the temperatures already discussed above is made possible.

What is claimed is:

1. A method for additive manufacture of a three-dimensional metallic component, the method comprising:
   preheating a wire comprising metallic material under vacuum conditions by at least one of (1) direct electric preheating by means of resistance heating and (2 inductive preheating;
   delivering the preheated wire to a processing location;
   fusing the metallic material at the processing location under vacuum conditions by means of a radiation source with high energy density, said radiation source comprised of a laser beam; and
   continuously repeating the delivering and fusing steps while maintaining the wire in a preheated state, thereby building up said component in layers or sections.

2. The method as claimed in claim 1, wherein the wire is directly electrically preheated by means of resistance heating.

3. The method as claimed in claim 2, wherein a current for heating the wire is conducted via the wire and via a workpiece upon which said layers or sections are built.

4. The method as claimed in claim 3, wherein the wire is heated using direct current, wherein a negative polarity is applied to the wire and a positive polarity is applied to the workpiece.

5. The method as claimed in claim 1, wherein the wire is inductively preheated.

6. The method as claimed in claim 1, wherein the fusing step is performed within a vacuum chamber, and wherein the wire is supplied through a vacuum leadthrough into the vacuum chamber.

7. The method as claimed in claim 6 wherein the wire is supplied preheated into the vacuum chamber.

8. The method as claimed in claim 1, wherein the fusing step is performed within a vacuum chamber, and wherein the laser beam is introduced through a window into the vacuum chamber.

9. The method as claimed in claim 8, wherein the window is purged with a gas.

10. The method as claimed in claim 1, further comprising moving a workpiece upon which said layers or sections are built relative to the processing location, which is thereby configured so as to be stationary.

11. The method as claimed in claim 1, wherein the wire is heated to a solidus temperature of the metallic material.

* * * * *